July 2, 1946. K. R. SJOGREN Re 22,770

LAPPING BLOCK

Original Filed March 21, 1944

Inventor
Knut R. Sjogren
Lyon & Lyon
By Attorneys

Reissued July 2, 1946 Re. 22,770

UNITED STATES PATENT OFFICE 22,770

LAPPING BLOCK

Knut Robert Sjogren, Los Angeles, Calif.

Original No. 2,368,575, dated January 30, 1945, Serial No. 527,383, March 21, 1944. Application for reissue December 20, 1945, Serial No. 636,245

2 Claims. (Cl. 51—212)

My invention relates to lapping blocks and, more specifically, to blocks for lapping the points of a micrometer to square the same.

I have found that a micrometer can be lapped to squareness only by the use of three or more differently thick lapping blocks or lapping block sections. If less than three be used, it is impossible to obtain true squareness at the micrometer points, although mutual parallelism between them is obtainable.

An object of my invention is to provide a lapping block adapted to lap micrometer points to true squareness.

Another object of the invention is to provide a lapping block which contains its own abrasive compound.

A further object is to provide a lapping block which can be easily and cheaply manufactured and easily used.

Additional objects and advantages manifest themselves throughout the following description of a preferred embodiment of said invention.

Figure 1:
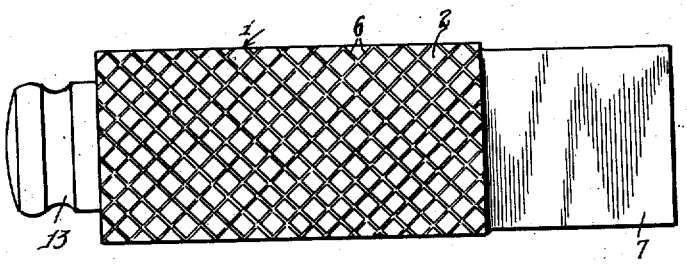
Figure 1 is a plan view of said embodiment or lapping block.
Figure 2:
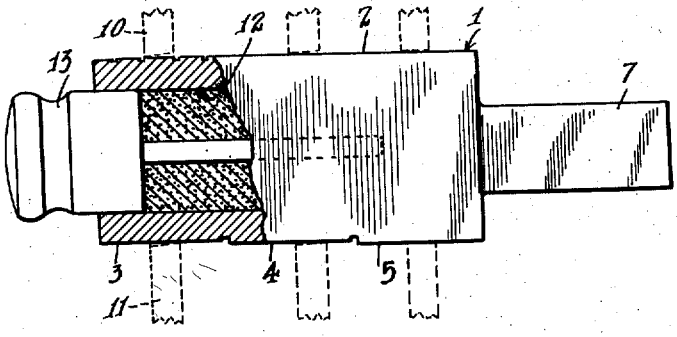
Figure 2 is a side view thereof, partly in section.
Figure 3:
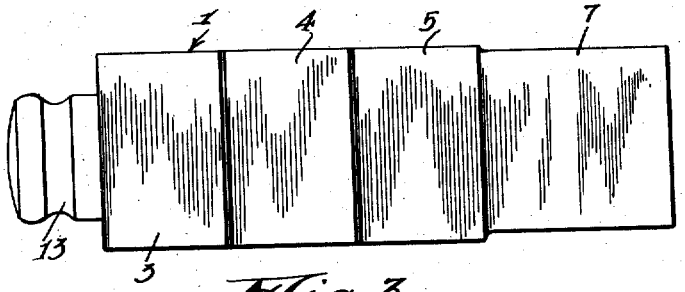
Figure 3 is a bottom view thereof.

In said embodiment, there is a body 1, which has a lapping surface 2, which is parallel with the three mutually successively adjacent control surfaces 3, 4 and 5, which are parallel with and opposed to surface 2 in a manner whereby each of said control surfaces and a thereto opposed part of surface 2 together correspond to a lapping block section and which is differently thick from each of the two other lapping block sections. On the surface 2 are cut grooves 6 for the reception of a lapping block compound, such as powdered carborundum. The surfaces 3, 4 and 5 are all parallel with surface 2, and each successive one of said control surfaces is progressively further apart from surface 2 in the order mentioned. One rotation of an English micrometer causes the movable point thereof to move .025 inch. One rotation of a metric micrometer causes the movable point thereof to move one millimeter. I therefore dispose the surface 3 at any given spacing from the surface 2 and I fix the distance between surfaces 2 and 4, in the case of an English micrometer, at one-third of .025 inch greater than that between surfaces 2 and 3. Similarly, the distance between surfaces 2 and 5 is one-third of .025 inch greater than that between surfaces 2 and 4. While the steps correspond to one-third of a rotation, two-thirds of a rotation would also be practical. Otherwise described, the control surfaces 3, 4 and 5 are successively stepped and the difference between the respective distances from surface 2 of each two adjacent said control surfaces is equal to the quotient, arrived at by diving one fortieth of an inch, in the case of an English micrometer, by the number that corresponds to the plurality of control surfaces in question, which, in this particular embodiment, is three; therefore the divisor is three. If the micrometer should be of the metric-measuring type, one millimeter, instead of one fortieth of an inch, would be divided.

In the use of my lapping blocks, a projection 7 is inserted in a vise, surface 2 facing upwardly. Upon it, is placed a mass of lapping or abrasive compound. The micrometer points 10 and 11 are then disposed upon the surfaces 2 and 3 respectively, and point 10 is lapped until smooth. Thereupon the micrometer position is reversed for the smooth lapping of point 11 on surface 2. During each of the above two operations, the frame of the micrometer is disposed in at least three differently angular aspects relatively to the longitudinal axis of the block, namely, for example, thirty, one hundred and fifty and two hundred and seventy degrees. The movable point is then moved correspondingly to one third of a rotation and points 10 and 11 are then lapped smooth on surface 2 under control of the control surface 4. Thereupon the points are again lapped smooth under the control of control surface 5. Upon completion of said lapping operations, it will have been found that the two points are not only smooth and parallel with one another but are, respecting their two respective end surfaces, normal to the axis of the points.

To store the lapping compound, I form the bore 12 in the center of the body 1 and I provide a cap 13 therefor. Into bore 12 can be placed a mass of any convenient and desired lapping compound. The body 1 can be of any thickness deemed suitable for the size of the micrometer or micrometers in question.

While I have described the preferred embodiment, I am not to be limited thereto excepting as set forth in the following claims.

I claim:

1. In a lapping block, a body having a lapping surface and a plurality of at least three mutually successively adjacent control surfaces parallel with and opposed to said lapping surface in a manner whereby each of said control surfaces and a thereto opposed part of said lapping surface together correspond to a lapping section of the block, said control surfaces being successively stepped and the difference between the respective distances from said lapping surface of each two adjacent said control surfaces being equal to the quotient, arrived at by dividing one fortieth of an inch by the number indicating said plurality of control surfaces.

2. A lapping block body as set forth in claim 1, excepting that one millimeter is divided instead of one fortieth of an inch.

KNUT ROBERT SJOGREN.